J. Stark.
Seed Planter.
No. 93,762. Patented Aug. 17, 1869.
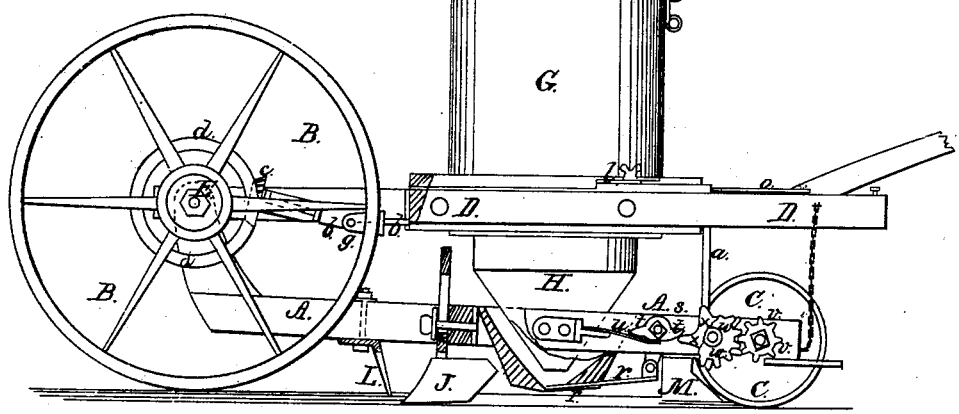
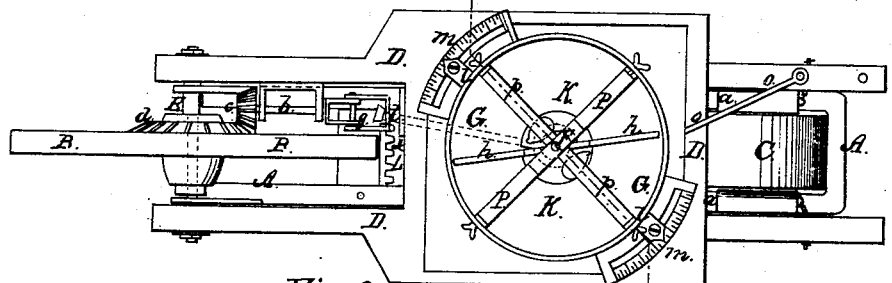
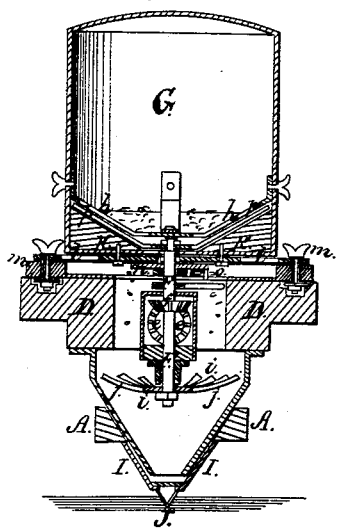
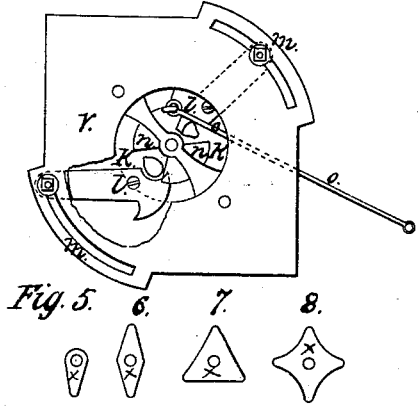
Witnesses:
Wm. A. Morgan
P. C. Dieterich
Inventor:
J. Stark
per Munn & Co
attys.

J. Stark.
Seed Planter.
Nº 93,762. Patented Aug. 17, 1869

Witnesses,
Wm A Morgan
Philip C Dieterich.

Inventor.
J. Stark
pr Munn & Co
Attorneys.

United States Patent Office.

JOHN STARK, OF THOMASVILLE, GEORGIA.

Letters Patent No. 93,762, dated August 17, 1869.

---

IMPROVEMENT IN SEEDING-MACHINES.

---

The Schedule referred to in these Letters Patent and making part of the same.

---

*To all whom it may concern:*

Be it known that I, JOHN STARK, of Thomasville, in the county of Thomas, and State of Georgia, have invented a new and improved Seed-Planter; and I do hereby declare that the following is a full, clear, and exact description thereof, which will enable others skilled in the art to make and use the same, reference being had to the accompanying drawings, forming a part of this specfication.

Figure 1, Sheet I, represents a side elevation, partly in section, of my improved seed-planter.

Figure 2, Sheet I, is a plan or top view, partly in section, of the same.

Figure 3, Sheet I, is a vertical transverse section of the same, taken on the plane of the line $x\ x$, fig. 2.

Figure 4, Sheet I, is an inverted plan view of the seed-box of the same.

Figures 5, 6, 7, and 8, Sheet I, are detail side views of the cam-wheels used for operating the seed-slide.

Figure 9:
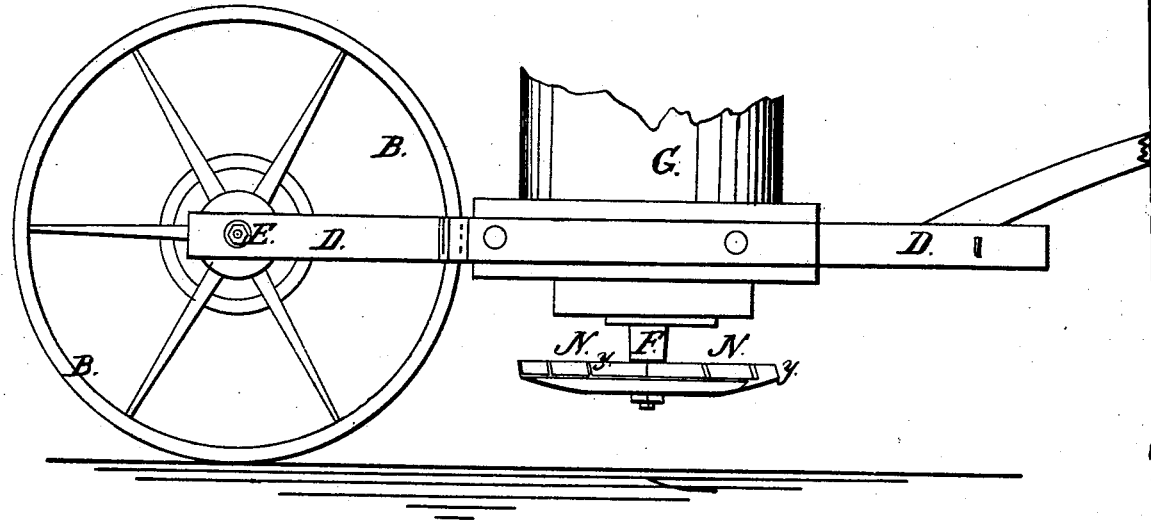

Figure 9, Sheet II, is a side elevation of my improved machine, when converted into a sowing-machine.

Figure 10:
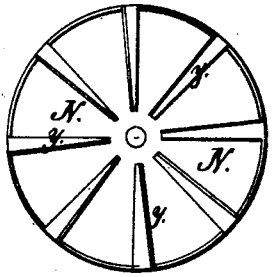

Figure 10, Sheet II, is a detail plan view of the scattering-attachment to the sowing-machine.

Similar letters of reference indicate corresponding parts.

This invention relates to certain improvements on the seed-planter for which Letters Patent No. 72,333 were granted to me on the 17th day of December, 1867.

The object of the present improvements is, first, to simplify the whole apparatus, and second, to allow the seed-planter to be used as a fertilizer, and to make it convertible into a sowing-machine.

The invention consists—

First, in a new manner of operating the seed-slide from the axle of the rear supporting-wheel.

Second, in arranging a rotating reel within the drop-box for separating cotton-seed and for breaking up lumps of fertilizing matter that might enter the box.

Third, in providing adjustable gates for the seed-apertures, the position of said gates being regulated by the aid of graduated scales.

Fourth, in providing an oscillating plate and lever, by means of which the seed-apertures can at once be closed.

Fifth, in providing a scattering-wheel, which can be placed on the rotating vertical shaft of the seed-box, in place of the drop-box, to scatter the seed when the apparatus is to be used as a sowing-machine.

A, in the drawing, represents the main frame of my machine, supported in front by the main wheel B, and in rear by a follower wheel, C.

D is the upper frame, pivoted in front to the axle E of the wheel B, and supported in rear by the bars $a$, projecting downward, as shown, and all substantially as described in the aforesaid Letters Patent.

F is a vertical shaft, fitted through the rear part of the frame D, and projecting above and below the same.

Its upper part fits into the hopper, or seed-receptacle G, which is fastened upon the frame, while its lower part is in a funnel-shaped drop-box, H, that is removably attached to the under side of the frame D, all as shown in fig. 3.

The shaft F receives rotary motion from the front axle E, by means of a jointed connecting-rod, $b$, which has pinions on its both ends, the front pinion $c$ meshing into a gear-wheel, $d$, that is mounted on E, while the rear pinion $e$ meshes into a pinion, $f$, on F, as shown in fig. 3.

The rod $b$ consists of two pieces, which are connected by a universal joint, $g$, which allows the said rod to be bent as shown.

The shaft F carries, within the seed-box G, two or more stirrers, $h\ h$, which are shaped so as to play directly above the conical or other bottom of the said seed-box.

On the lower end of the shaft F is mounted a disk, $i$, from which a number of radial arms $j\ j$ project, as shown. This disk works in the funnel H, and serves to separate cotton-seed, and to break up lumps of fertilizing matter that may have entered the said funnel.

The bottom-plate $k$ of the hopper G has two or more or less apertures, through which the seed is to be dropped.

Under the plate $k$ are pivoted as many plates $l$ as there are apertures, each plate being so shaped that it can be swung to close its aperture more or less.

The outer end of each plate $l$ works on a graduated scale, $m$, as shown in fig. 2, and can, by means of a thumb-screw, be clamped in any desired position to leave the seed-holes more or less open, so that just the requisite amount of seed will be dropped.

Under the plate $l$ is fitted, around the shaft F, a plate, $n$, which has as many projecting arms or segments as there are apertures in $k$.

This plate $n$ is connected with a lever, $o$, which can be worked from the outside, and by means of which the said plate can be easily turned to instantaneously close the seed-holes, whenever desired.

In the hopper G are, above the stirrer $h$, arranged stationary bars $p$, which also serve, like the plate $i$, to separate cotton-seed, and to break the lumps of fertilizing matter.

The seed or fertilizing material is put into the hopper G, passes through the apertures of the plate $k$, and is then scattered in the drop-box H by the plate $i$. It is then collected in the mouth of the said box H, and discharged into the box I, which is attached to the frame A, and into which the lower end of H is fitted.

The lower end of I is closed by means of a slide, $r$, which is, at its rear end, pivoted to a crank projecting from a rock-shaft, $s$, as shown in fig. 1.

On this rock-shaft is mounted a disk, $t$, having two arms, against one of which a spring, $u$, is fitted, to prevent the said rock-shaft from turning.

On the axle of the rear wheel C is mounted a pinion, $v$, of suitable size, meshing into a toothed wheel, $w$, on the arbor of which a toothed cam, $x$, is mounted. This cam is thus turned, and will, as it revolves, strike against the backward-projecting arm of the disk $t$, thereby causing, in connection with the spring $u$, oscillating motion to be imparted to the rock-shaft. By this means the slide $r$ is pulled back and forth, to alternately open and close the box I, and to thereby regulate the discharge of seed.

The velocity of motion of the slide, and thereby the distance between the discharges of seed, can be regulated by having different kinds of cams $x$, of which some are shown in figs. 1, 5, 6, 7, and 8, those having the least number of teeth causing the least number of discharges during one revolution of the wheel C. By having different respective diameters of the gear-wheels $v$ and $w$, the discharge will also be regulated.

In front of the drop I is arranged, on the frame A, an up-and-down adjustable plowshare, J, by means of which the desired furrow is drawn.

In front of the plow is a rake, L, which clears the ground for the reception of the seed or manure.

In rear of the drop are the oblique scrapers M, which serve to close the furrow over the seed.

When it is desired to use the machine for scattering seed, the whole frame A is removed, so that the wheel B remains on the upper frame D, as shown in fig. 9.

The lower box H is also taken off, as well as the disk $i$, in place of which a large circular plate, N, is fastened to the shaft F.

This plate N has a series of radial-projecting ribs $y$ $y$, which stand inclined, as shown in figs. 9 and 10, and which, when the plate is revolved by the forward motion of the machine, throw the seed in all directions, so as to well scatter it.

Thus a complete combined seed-planter, sowing-machine, and fertilizer is produced.

Having thus described my invention,

I claim as new, and desire to secure by Letters Patent—

1. The adjustable seed-slides $l\ l$, constructed as described, operating upon the graduated scales $m$, in combination with the perforated plate $k$, as herein described, for the purpose specified.

2. The oscillating plate $n$, for closing the seed-apertures, when operated by means of the lever $o$, substantially as herein shown and described.

3. The application to a seed-planter of the rotating upright shaft F, on which the separating disk $i$, having the arms $j$, is mounted, for separating cotton-seed and for breaking up the lumps of fertilizing material, substantially as described.

4. The apparatus for operating the reciprocating slide $r$, consisting of the oscillating arbor $s$, having the cam $t$ of the spring $u$, toothed disk $x$, and gear-wheels $w$, all made and operating substantially as described.

5. The combination, with the seed-slide $r$ and supporting-wheel C, of the spring $u$, cam $t$, rock-shaft $s$, gear-wheels $w\ v$, and the cam $x$, operating substantially as described, for the purpose specified.

6. The combination, in a seed-planter, of the hopper G, plates $l\ l$ and $n$, shaft F, disk $i$, having the arms $j$, with the hopper H and box I, all made and operating substantially as herein shown and described.

JOHN STARK.

Witnesses:
FRANK BLOCKLEY,
ALEX. F. ROBERTS.